United States Patent
Samanta et al.

(10) Patent No.: US 9,058,274 B2
(45) Date of Patent: Jun. 16, 2015

(54) SYSTEM AND METHOD OF SELECTIVE READ CACHE RETENTION FOR A REBOOTED NODE OF A MULTIPLE-NODE STORAGE CLUSTER

(71) Applicant: LSI Corporation, San Jose, CA (US)

(72) Inventors: Sumanesh Samanta, Bangalore (IN); Sujan Biswas, Bangalore (IN); Horia Cristian Simionescu, Foster City, CA (US); Luca Bert, Cumming, GA (US); Mark Ish, Sandy Springs, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 255 days.

(21) Appl. No.: 13/924,773

(22) Filed: Jun. 24, 2013

(65) Prior Publication Data
US 2014/0344523 A1 Nov. 20, 2014

(51) Int. Cl.
G06F 12/00 (2006.01)
G06F 12/08 (2006.01)

(52) U.S. Cl.
CPC .......... *G06F 12/084* (2013.01); *G06F 12/0811* (2013.01); *G06F 12/0897* (2013.01); *G06F 12/0815* (2013.01)

(58) Field of Classification Search
CPC .............. G06F 12/084; G06F 12/0811; G06F 12/0815; G06F 12/0897
See application file for complete search history.

(56) References Cited

U.S. PATENT DOCUMENTS

| | | | |
|---|---|---|---|
| 6,988,171 B2 | 1/2006 | Beardsley et al. | |
| 7,610,433 B2* | 10/2009 | Randell et al. | 711/101 |
| 7,793,166 B2 | 9/2010 | Benhanokh et al. | |
| 8,364,887 B2 | 1/2013 | Wong et al. | |
| 2005/0185472 A1* | 8/2005 | Randell et al. | 365/185.33 |
| 2013/0282988 A1* | 10/2013 | Miller et al. | 711/141 |

* cited by examiner

*Primary Examiner* — John Lane
(74) *Attorney, Agent, or Firm* — Suiter Swantz pc llo

(57) ABSTRACT

The disclosure is directed to a system and method for managing READ cache memory of at least one node of a multiple-node storage cluster. According to various embodiments, a cache data and a cache metadata are stored for data transfers between a respective node (hereinafter "first node") and regions of a storage cluster. When the first node is disabled, data transfers are tracked between one or more active nodes of the plurality of nodes and cached regions of the storage cluster. When the first node is rebooted, at least a portion of valid cache data is retained based upon the tracked data transfers. Accordingly, local cache memory does not need to be entirely rebuilt each time a respective node is rebooted.

20 Claims, 2 Drawing Sheets

SYSTEM AND METHOD OF SELECTIVE READ CACHE RETENTION FOR A REBOOTED NODE OF A MULTIPLE-NODE STORAGE CLUSTER

PRIORITY

The present application claims priority under 35 U.S.C. 119(b) to Indian Patent Application Serial No. 580/KOL/2013, entitled SYSTEM AND METHOD OF SELECTIVE READ CACHE RETENTION FOR A REBOOTED NODE OF A MULTIPLE-NODE STORAGE CLUSTER, By Sumanesh Samanta et al., filed May 20, 2013, which is currently co-pending, or is an application of which a currently co-pending application is entitled to the benefit of the filing date.

FIELD OF INVENTION

The disclosure relates to the field of cache management in multiple-node data storage systems.

BACKGROUND

Data storage systems, such as redundant array of independent disks (RAID) systems typically provide protection against disk failures. However, direct attached storage (DAS) RAID controllers have little to no defense against server failure because they are typically embedded within a server. Two or more nodes (i.e. servers) are often used for high availability storage clusters to mitigate consequences of a failure.

In multiple-node storage clusters, cache is frequently maintained on a local server. This local cache, often running from Gigabytes to Terabytes in size, helps in low latency and high performance completion of data transfers from regions of the storage cluster experiencing high activity or "hot" input/output (IO) data transfer requests. The local READ cache of a temporarily disabled node can become stale or invalid because other nodes continue to actively transfer data to both cached and non-cached regions of the storage cluster. Thus, when the node is rebooted, old cache data is typically purged and new local cache is built for the rebooted node, which can be very time consuming and degrading to node performance.

SUMMARY

Various embodiments of the disclosure include a system and method for managing local cache memory of at least one node of a multiple-node storage cluster to retain a valid portion of cache data in the local cache memory after a respective node is rebooted. According to various embodiments, the storage cluster includes a plurality of storage devices, such as one or more JBOD complexes, accessible by a plurality of nodes in communication with the storage cluster. At least one storage device is configured to store cache memory for a respective node (hereinafter "first node") of the plurality of nodes. The cache memory including cache data and cache metadata associated with data transfers between the first node and regions of a storage cluster.

When the node is temporarily disabled (e.g. failed, shutdown, or restarted), at least a portion of the cache data may become stale or invalid as a result of data transfers from other (active) nodes to the cached regions of the storage cluster. At least one controller is configured to track data transfers between one or more active nodes and cached regions of the storage cluster when the first node is disabled. A cache manager in communication with the cache memory is configured to receive information associated with the tracked data transfers when the node is rebooted. The cache manager is further configured to retain at least a portion (i.e. a valid portion) of the cache data based upon the tracked data transfers. Accordingly, the local cache does not need to be entirely rebuilt because at least a portion of valid cache data is retained when the respective node is rebooted.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

Figure 1:
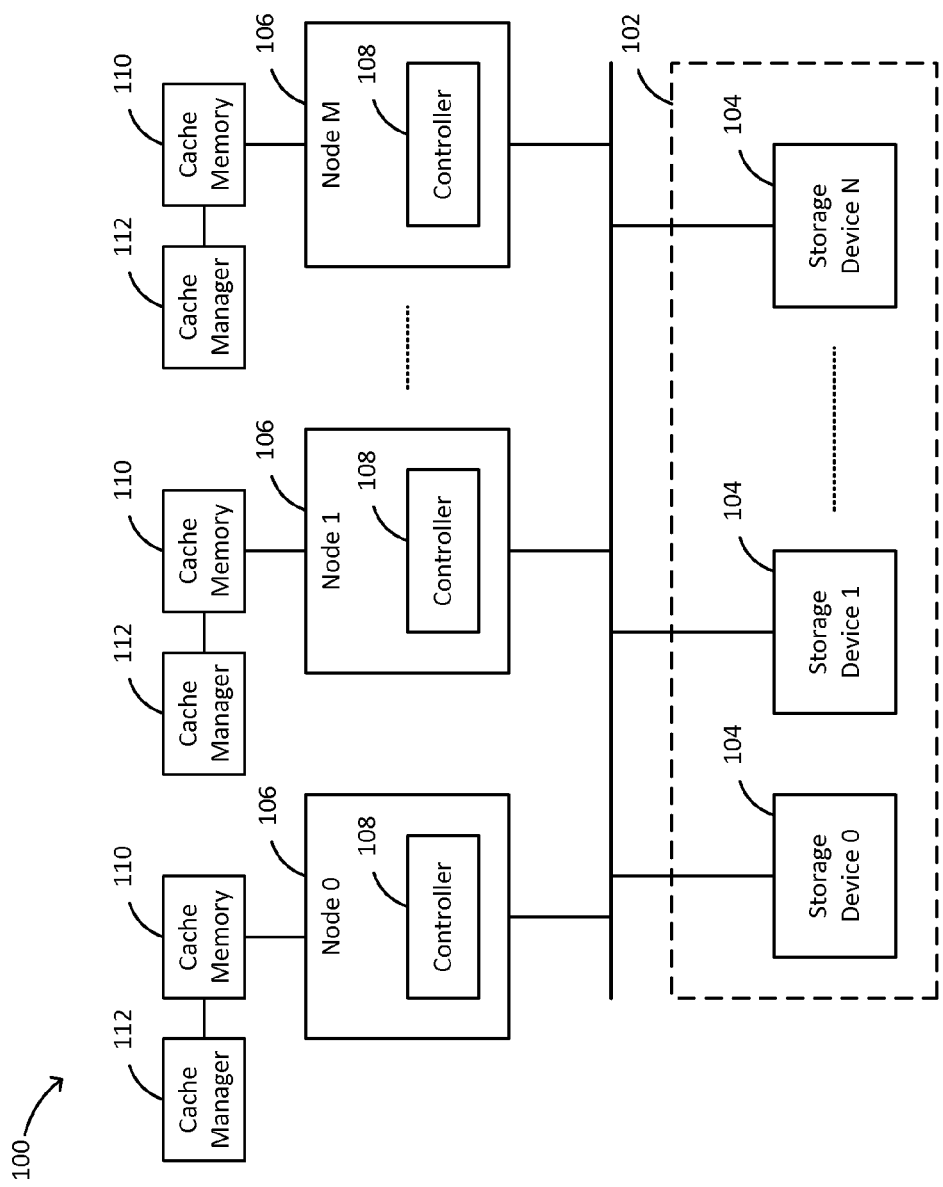
FIG. 1 is a block diagram illustrating a multiple-node storage system, in accordance with an embodiment of the disclosure.

FIG. 1 illustrates an embodiment of a multiple-node storage system 100. The system 100 includes at least one storage cluster 102, such as a high availability cluster, accessible by a plurality of server nodes 106. Each node 106 includes at least one controller 108 such as, but not limited to, a RAID controller, RAID on Chip (ROC) controller, or at least one single-core or multiple-core processor. The respective controller 108 of each node 106 is configured to transfer data to or from logical block address regions or "windows" defined across a plurality of storage devices 104, such as hard disk drives (HDDs) or solid-state disk (SSD) drives, making up the storage cluster 102.

In some embodiments, two or more groupings of the storage devices 104 are contained in two or more enclosures. In some embodiments, the enclosures are separately powered to allow a first server to take over a grouping of shared storage devices 104 and continue to process data transfer requests without disruption when a second server is permanently or temporarily disabled. In some embodiments, host nodes 106 include at least one processor running a computing program, such as WINDOWS SERVER or VMWARE CLUSTER SERVER, configured to provide planned or unplanned failover service to applications or Guest OS.

According to various embodiments, each node 106 includes or is communicatively coupled to at least one respective storage device 110 configured to store local cache memory. In some embodiments, the local storage device 110 includes a SSD drive. The cache memory 110 is configured to aid data transfers between the respective node 106 and cached regions of the storage cluster 102 for low latency data transfers and increased IO operations per second (IOPs). In some embodiments, the local storage device 110 is onboard the controller 108 or coupled directly to the respective node 106, thus sharing the same power domain.

A local cache manager 112 in communication with the cache memory 110 is configured to manage cache data and cache metadata stored in the cache memory 110. In some embodiments, the cache manager 112 includes at least one dedicated processor or controller configured to manage the cache memory 110 for at least one respective node 106 according to program instructions executed by the processor from at least one carrier medium. In some embodiments, the cache manager 112 includes a module running on the controller 108 or a processor of the respective node 106.

In some embodiments, the system 100 includes a High Availability DAS cluster with very large (e.g. one or more terabytes) cache memory 110 for each node 106. Large cache memory 110 can provide a significant boost in application performance; however, a considerable amount of time is needed to ramp up or compile cache data. In some instances, a particular node 106 is temporarily disabled (may be only for a few minutes) due to failure, shutdown, suspension, restart, routine maintenance, power cycle, software installation, or any other user-initiated or system-initiated event resulting in an period of nodal inactivity. Several means exist in the art for retaining READ cache data and cache metadata of a respective node 106 when the node 106 is either intentionally or unintentionally disabled.

Flushing is not required for retention of the cache data because the cache data is stored in non-volatile cache memory 110, such as a solid-state disk (SSD) or any other storage device configured to retain stored information without power. The key is flushing and storing metadata, since Metadata is stored in volatile random access memory (RAM), and the cache data is useless without the metadata. In some embodiments, the cache manager 112 is configured to store cache metadata to the non-volatile cache memory 110 or another non-volatile memory by flushing metadata from RAM to the non-volatile memory prior to intentionally disabling (e.g. shutting down, restarting, or suspending) the respective node 106. In some embodiments, when the node 106 is unintentionally disabled (e.g. power failure), a supercapacitor or battery backup enables a copy of the RAM image to be stored in the non-volatile memory when the node 106 is disabled. When the node 106 is rebooted, the cache metadata is read back from the non-volatile (persistent) memory to the RAM. In other embodiments, the cache manager 112 is configured for periodic saving of consistent READ cache metadata or any alternative READ cache retention schemes known to the art.

Simple retention of READ cache data does not cure the consequences arising from a temporarily disabled node 106 for the multiple-node storage system 100. The READ cache data cannot be trusted after a node 106 is rebooted (i.e. restarted or returned to an active state) because the other nodes 106 continue to transfer data to or from the storage cluster 102 while the node 106 is disabled or rebooting. Accordingly, at least a portion of the READ cache data in the local cache memory 110 may be stale or invalid when the node 106 resumes activity. In some embodiments, at least a portion of the READ cache data for a first node 106 becomes invalid when one or more of the other nodes 106 transfer (WRITE) data to regions of the storage cluster 102 cached for the first node 106. Accordingly, the READ cache data is typically purged from the cache memory 110 when a respective node 106 is rebooted. Rebuilding a fresh cache each time a node 106 is rebooted can be very time consuming, thus resulting in significantly reduced performance each time a node is rebooted.

Figure 2:
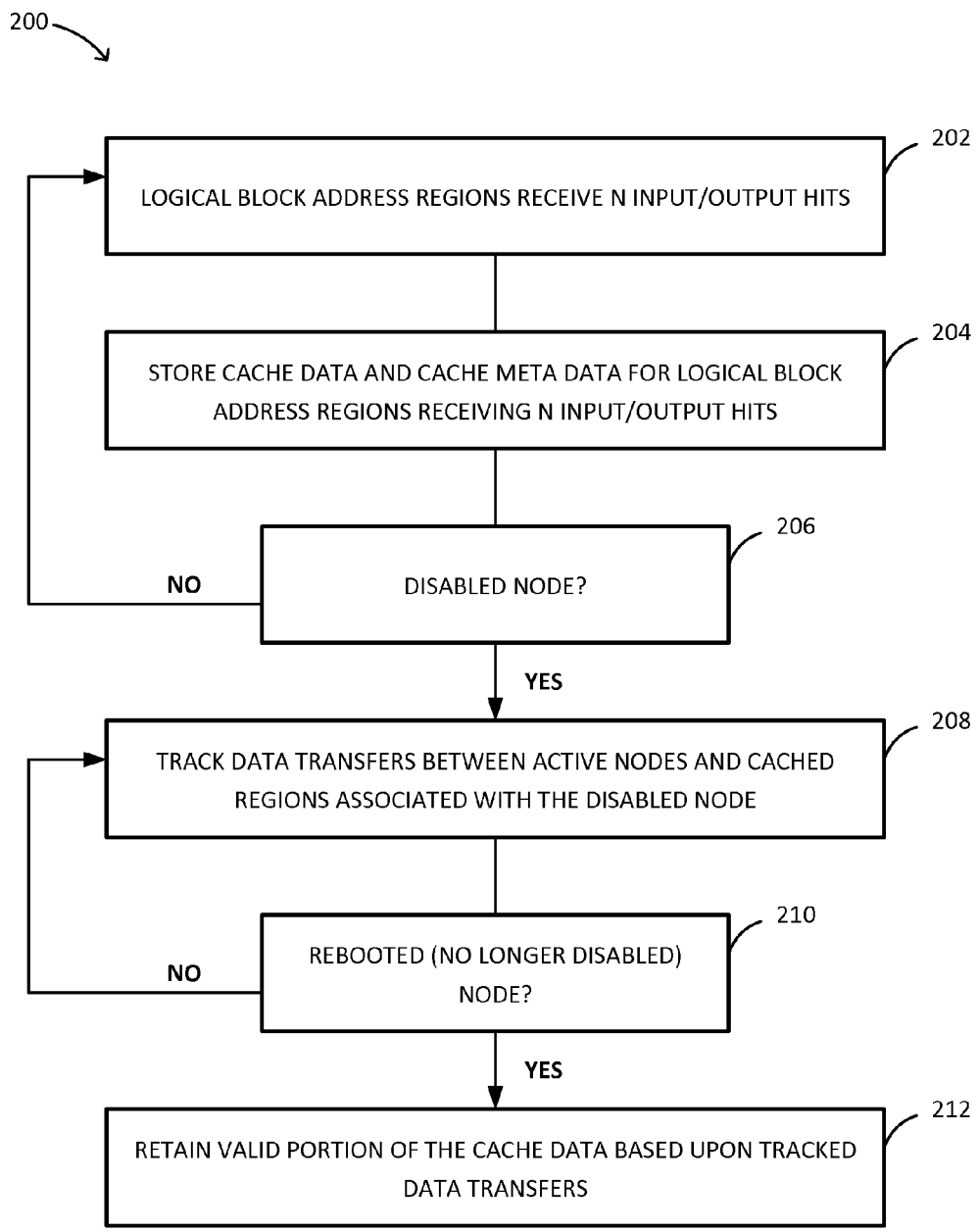
FIG. 2 is a flow diagram illustrating a method of managing cache for a rebooted node of a multiple-node storage system, in accordance with an embodiment of the disclosure.

FIG. 2 illustrates a method 200 of selectively retaining valid portions of the READ cache data instead of building an entirely new cache each time a node is temporarily disabled or rebooted. In some embodiments, method 200 is manifested by system 100. However, one or more steps may be effected by additional or alternative means beyond those described with regard to embodiments of system 100. Method 200 is intended to encompass any appropriate means for carrying out the steps that follow.

At step 202, high activity or "hot" logical block address (LBA) regions of the storage cluster 102 are cached for each of the nodes 106 in a respective local cache memory 110. In some embodiments, the hot regions are those regions receiving at least a selected number "N" data transfer requests. In some embodiments, for example, a region may be considered hot after receiving N=3 IO hits. At step 204, cache data and cache metadata are stored in the cache memory 110 of each node 106 for the hot regions of the storage cluster 102. In some embodiments, the cache manager 112 is configured to store READ cache data associated with data transfers between a respective node 106 (hereinafter "first node") and the hot regions of the storage cluster 102. The cache manager 112 is further configured to store cache metadata associated with the cached regions of the storage cluster 102. According to step 206, the hot regions of the storage cluster 102 continue to be actively cached (steps 202 and 204) until the first node 106 is temporarily disabled or rebooted.

At step 208, at least one controller or processor is configured to track data transfers from active (peer) nodes 106 to cached regions of the storage cluster 102 while the first node 106 is disabled. In some embodiments, each of the peer nodes 106 includes a respective controller 108 configured to the track data transfers. In some embodiments, the peer nodes 106 that are still serving IO data transfers keep track of their respective data transfers, that is WRITE commands that are served by each of the peer nodes 106. In some embodiments, the peer nodes 106 are configured to keep track of all served WRITE commands. Accordingly, the peer nodes 106 do not require information regarding the READ cache maintained by the first node 106. When the first node 106 comes back, the retained portion of the READ cache is based on tracking data including information about all WRITE commands while the first node 106 was down. In other embodiments, the active peer nodes 106 only keep track of WRITE commands served for regions associated with the READ cache data stored in the cache memory 110 of the first node 106. Thus, the peer nodes 106 require information associated with the cached regions of the first node 106, but as a result, the tracking data is advantageously limited to information relevant to data regions cached for the first node 106.

According to step 210, the tracking continues until the first node 106 is rebooted (or brought back into an active state). When the first node 106 reboots, information associated with the tracked data transfers is sent to the first node 106. At step 212, the cache manager 112 of the first node 106 is configured to utilize the received information (i.e. tracking data) to selectively purge or invalidate at least a portion of the READ cache data associated with the regions receiving data transfers from the peer nodes 106 while the first node 106 is disabled. In some embodiments, the cache manager 112 is configured to purge a first (invalid) portion of cache data and retain a second (valid) portion of cache data based upon the tracking data. The valid portions of the READ cache are retained in the cache memory 110 and the first node 106 continues to use the valid portion of the READ cache to serve IO data transfers. Especially as cache size increases and when the first node 106 is down only for a short period of time, significant amounts of time are saved by retaining a valid portion of the local cache rather than building a fresh cache each time a respective node 106 is rebooted.

Since source Virtual Disks (VD) can be very large (e.g. terabytes of size), keeping track of data transfers occurring while the first node 106 is down may require a huge amount of random access memory (RAM) and processing power, thereby slowing down overall IOPs. In some embodiments, the one or more controllers 108 tracking data transfers from the peer nodes 106 are configured to generate at least one data structure, such as a bitmap, associated with data transfers to the cached regions while the first node is disabled. In some embodiments, each bit represents a hash bucket in the hash table normally maintained in the cache memory 110 to keep track of the cached LBA regions. The Hash table is traversed anyway for each IO so keeping a bit for each hash bucket does not require a significant amount of additional computation or memory. In some embodiments, for example, keeping a bitmap for each entry requires as little as 32K of RAM space when there are 256K hash entries.

According to such embodiments, at step 208, the peer nodes 106 track the data transfers by setting a bit (e.g. set to 'on' of '1') for every hash bucket that receives a WRITE command while the first node 106 is disabled. When the first node 106 resumes activity after being rebooted, the one or more controllers 108 of the one or more peer nodes 106 or a distinct (tracking) processor or controller send the tracking data to the rebooted first node 106. The cache manager 112 of the first node 106 is configured to then selectively purge or invalidate READ cache data or metadata entries for regions having received a WRITE command while the first node 106 was disabled. For instances where a node is temporarily disabled for just a few minutes (e.g. for software installation or restarting/rebooting), very few WRITE commands are likely to occur in the meantime. Thus the rebooted node may retain and re-use most of the READ cache data, significantly reducing time and processing power typically spent ramping up cache when a node is rebooted.

In some embodiments, when the first node 106 resumes activity after rebooting, the peer nodes 106 are configured to momentarily stop data transfers while sending the WRITE tracking data to the first node 106. The peer nodes 106 resume transferring data to or from the storage cluster 102 after the rebooted node 106 acknowledges receipt of the tracking data. In some embodiments, the nodes 106 are configured to follow a peer invalidation process for regular IO in cluster setup. The rebooted first node 106 is configured to momentarily stop procession peer communication and process the tracking data and any additional invalidate command already received from the peer nodes 106 to update the READ cache. After the READ cache is updated the first node 106 starts serving IO data transfer requests from the host and also re-starts peer communication.

It should be recognized that in some embodiments the various functions or steps described throughout the present disclosure may be carried out by any combination of hardware, software, or firmware. In some embodiments, various steps or functions are carried out by one or more of the following: electronic circuits, logic gates, field programmable gate arrays, multiplexers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for managing READ cache memory, comprising:
   a cache memory for a first node of a plurality of nodes, the cache memory including cache data associated with data transferred between the first node and regions of a storage cluster;
   at least one controller configured to track data transfers between one or more nodes of the plurality of nodes and one or more of the cached regions of the storage cluster when the first node is disabled; and
   a cache manager in communication with the cache memory, the cache manager configured to receive information associated with the tracked data transfers, and further configured to retain at least a portion of the cache data based upon the tracked data transfers when the first node is rebooted.

2. The system of claim 1, wherein the cache manager is further configured to purge at least a portion of the cache data associated with the tracked data transfers from the cache memory.

3. The system of claim 1, wherein the cache manager is further configured to purge at least a portion of cache metadata stored in the cache memory, the purged portion of the cache metadata being associated with the one or more of the cached regions of the storage cluster receiving the tracked data transfers.

4. The system of claim 1, wherein the at least one controller is configured to generate a data structure associated with the tracked data transfers, and further configured to send the data structure to the cache manager when the first node is rebooted.

5. The system of claim 4, wherein the cache manager is configured to purge a first portion of cache data and retain a second portion of cache data based upon the data structure.

6. The system of claim 5, wherein the cache manager is configured to purge at least a portion of cache metadata stored in the cache memory based upon the data structure, the purged portion of the cache metadata being associated with the one or more of the cached regions of the storage cluster receiving the tracked data transfers.

7. A storage system, comprising:
   a storage cluster including a plurality of storage devices;
   a plurality of nodes in communication with the storage cluster;

a cache memory for a first node of the plurality of nodes, the cache memory including cache data associated with data transferred between the first node and regions of a storage cluster, at least one node of the plurality of nodes including at least one controller configured to track data transfers between the at least one node and one or more of the cached regions of the storage cluster when the first node is disabled; and a cache manager in communication with the cache memory, the cache manager configured to receive information associated with the tracked data transfers, and further configured to retain at least a portion of the cache data based upon the tracked data transfers when the first node is rebooted.

8. The storage system of claim 7, wherein the cache manager is further configured to purge at least a portion of the cache data associated with the tracked data transfers from the cache memory.

9. The storage system of claim 7, wherein the cache manager is further configured to purge at least a portion of cache metadata stored in the cache memory, the purged portion of the cache metadata being associated with the one or more of the cached regions of the storage cluster receiving the tracked data transfers.

10. The storage system of claim 7, wherein each node of the plurality of nodes includes at least one controller configured to track data transfers from the respective node to the one or more of the cached regions of the storage cluster when the first node is disabled.

11. The storage system of claim 10, wherein the at least one controller of each node is configured to generate at least a portion of a data structure associated with the tracked data transfers, wherein the cache manager is configured to receive the data structure generated by the plurality of nodes when the first node is rebooted.

12. The storage system of claim 11, wherein the cache manager is configured to purge a first portion of cache data and retain a second portion of cache data based upon the data structure.

13. The storage system of claim 11, wherein the cache manager is configured to purge at least a portion of cache metadata stored in the cache memory based upon the data structure, the purged portion of the cache metadata being associated with the one or more of the cached regions of the storage cluster receiving the tracked data transfers.

14. A method of managing READ cache memory, comprising:

storing cache data associated with data transferred between a first node of a plurality of nodes and regions of a storage cluster;

tracking data transfers between one or more nodes of the plurality of nodes and one or more of the cached regions of the storage cluster when the first node is disabled; and retaining at least a portion of the cache data based upon the tracked data transfers when the first node is rebooted.

15. The method of claim 14, further comprising:

purging at least a portion of the cache data associated with the tracked data transfers.

16. The method of claim 14, further comprising:

invalidating at least a portion of cache metadata associated with the one or more of the cached regions of the storage cluster receiving the tracked data transfers.

17. The method of claim 14, further comprising:

generating a data structure associated with the tracked data transfers from the one or more nodes of the plurality of nodes to the one or more of the cached regions of the storage cluster.

18. The method of claim 17, further comprising:

sending the data structure from the one or more nodes of the plurality of nodes to the first node when the first node is rebooted.

19. The method of claim 17, further comprising:

purging a first portion of cache data based upon the data structure; and retaining a second portion of cache data based upon the data structure.

20. The method of claim 17, further comprising:

purging at least a portion of cache metadata stored in the cache memory based upon the data structure, the purged portion of the cache metadata being associated with the one or more of the cached regions of the storage cluster receiving the tracked data transfers from the one or more nodes of the plurality of nodes.

\* \* \* \* \*